(12) United States Patent
Morrison et al.

(10) Patent No.: US 8,935,679 B2
(45) Date of Patent: Jan. 13, 2015

(54) COMPILER OPTIMIZED SAFETY MECHANISM

(71) Applicants: Gary R. Morrison, Austin, TX (US); Brian C. Kahne, Austin, TX (US); Anthony M. Reipold, Austin, TX (US)

(72) Inventors: Gary R. Morrison, Austin, TX (US); Brian C. Kahne, Austin, TX (US); Anthony M. Reipold, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 233 days.

(21) Appl. No.: 13/648,501

(22) Filed: Oct. 10, 2012

(65) Prior Publication Data

US 2014/0101642 A1  Apr. 10, 2014

(51) Int. Cl.
*G06F 9/45*  (2006.01)
(52) U.S. Cl.
USPC .......................................... 717/140; 717/152
(58) Field of Classification Search
None
See application file for complete search history.

(56) References Cited

U.S. PATENT DOCUMENTS

| 7,549,085 | B2 | 6/2009 | Del Vigna, Jr. et al. | 714/35 |
| 7,584,405 | B2 * | 9/2009 | Osecky et al. | 714/784 |
| 7,747,897 | B2 | 6/2010 | Racunas et al. | 714/11 |
| 7,793,187 | B2 | 9/2010 | Wong et al. | 714/736 |
| 7,802,138 | B2 | 9/2010 | Sato | 714/22 |
| 2010/0281239 | A1 | 11/2010 | Sudhakar et al. | 712/222 |

FOREIGN PATENT DOCUMENTS

WO   WO 2011/101707 A1   8/2011   ............... G06F 9/38

OTHER PUBLICATIONS

Clematis, et al., "Process checkpointin primitives for fault tolerance: definitions and examples," Microprocessors and Microsystems, vol. 16, Issue 1, 1992, 1 page, abstract only.

* cited by examiner

*Primary Examiner* — Chuck Kendall
(74) *Attorney, Agent, or Firm* — Van Leeuwen & Van Leeuwen; Jonathan N. Geld

(57) ABSTRACT

An approach is provided in which a set of common instructions are each executed by at least two processor cores. Each of the processor cores queues values resulting from at least one of the common instructions (a critical section). The queued values are compared by a queued comparator. An exception is issued in response to the comparison revealing unequal values having been queued by the processor cores.

20 Claims, 5 Drawing Sheets

COMPILER OPTIMIZED SAFETY MECHANISM

TECHNICAL FIELD

This innovation relates generally to an approach that provides safety checking using multiple independent processor cores.

BACKGROUND

In a time-decoupled lockstep-execution system, where the cores can operate out of phase, or on slightly slower or faster, independent clock sources (for redundancy), timing concerns manifest themselves differently from fully-synchronous lockstep systems. Several timed, and time-management, mechanisms become critical.

BRIEF DESCRIPTION OF THE DRAWINGS

The present invention may be better understood, and its numerous objects, features, and advantages made apparent to those skilled in the art, by referencing the accompanying drawings, wherein.

DETAILED DESCRIPTION

In some applications, such as in automotive or industrial applications, computer systems are used to control devices that, if improperly deployed, could cause serious injury to the operator. Examples include automatic braking applications and airbag deployment applications found in modern automobiles. If such systems are deployed at the wrong time, such as an airbag being deployed while the driver is driving and not involved in an accident, serious accidents could result from the malfunctioned system. Such malfunctions can result from corrupt data being processed by microprocessors ("cores") that are typically the "brains" behind such safety systems. In the approach described below, multiple cores are utilized with each core processing the same set of safety-related data. If each of the cores process critical sections of code and result in the same value such value is deemed accurate. However, if one of the cores processes a critical section that results in a different value, then data corruption may have occurred and further checks (or resets) can take place without incorrectly initiating safety related actions. In addition, the approach set forth below allows the multiple cores to operate out-of-phase with one another eliminating, or reducing, much of the overhead and system cost of having such multiple cores operate in lock-step with one another.

Figure 1:
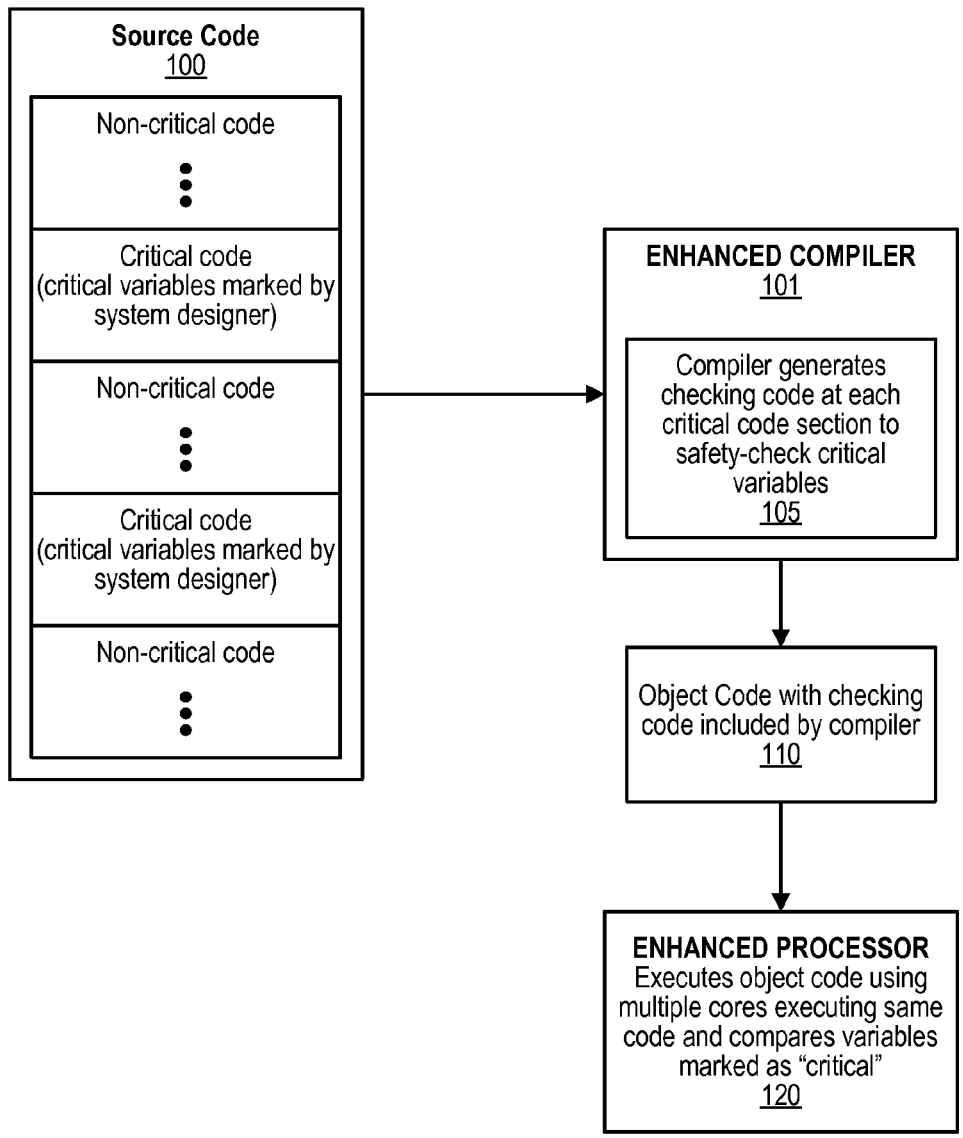
FIG. 1 is a block diagram of source code being compiled by an enhanced compiler that provides critical variable checking and an enhanced multi-core processor that compares critical variables.

FIG. 1 is a block diagram of source code being compiled by an enhanced compiler that provides critical variable checking and an enhanced multi-core processor that compares critical variables. Source code 100 includes various critical and non-critical sections of code. The critical sections are "marked" by a system designer (e.g., using a "critical" attribute, etc.) in order to indicate the sections that are critical. A critical section utilizes values that need to be "safety checked" for any possible errors. The safety checking is performed by having two (or more) processors execute the code with the "critical" sections being compared to ensure that the values generated by processor cores are equal to the values generated by other processor cores. If the values are different (unequal), a possible problem exists and corrective action can be taken, such as by an exception being triggered. For example, in an automotive system, calculated values used to trigger the deployment of an automatic air bag might be compared to the threshold value for triggering the air bag, provided that each of the processors calculate the same value. Checking to ensure that each processor in the system generates the same value prevents the air bag from being deployed due to data corruption when the actual environment does not necessitate such deployment (e.g., deployment when no accident/collision occurs, etc.).

Many prior-art checking schemes dictate comparing all values read from or written to memory. Having the system designer mark critical sections of code ensures that values constituting reliable indicators of correct operation will be checked at higher priority and greater certainty than non-safety-critical values. In addition, marking critical sections of code is more efficient and enables the system to check such items within a given process safety time, because they need not wait until they are evicted from the cache before they can be checked on write to memory. In addition, marking the critical sections avoids wasting resources and power checking non-critical items, thus freeing those resources to perform additional non-critical tasks.

Enhanced compiler 101 is used to compile source code 100 that includes sections marked as "critical" sections. At step 105, the compiler identifies the critical sections and generates checking code for each critical section of code. The generated checking code instructs the processor core to store (write) critical values to a queue. Queuing also applies to loads (reads), because the queue also holds address, transfer attributes, transfer size, etc., which are equally applicable to reads. The queue is monitored by a queue comparator that checks whether the values resulting from each of the processor cores are equal (as they should be). If the values are unequal, indicating that one of the processors may have been using corrupted data, then the queued comparator issues an exception (e.g., asserts a signal, etc.) so that corrective action may be taken. The result of compilation with enhanced compiler 101 is object code 110 that includes checking code. In one embodiment, this queue and comparator are implemented in hardware operating in parallel with the core's instruction-execution hardware. Furthermore, the compiler-generated code is implemented as an attribute of the load or store instruction that dictates a write to the queue. In this preferred embodiment, the write to the queue does not affect processor-core performance.

Enhanced processor 120 executes object (machine) code 110 using multiple processor cores that each execute the instructions included in object code 110. In an embodiment where the processors are using different architectures (ISAs), then the "same instructions" would actually be equivalent blocks of code with equivalent critical sections (e.g., object code compiled from same source but to two different machine language instructions based on the ISAs being used, etc.). As used herein, "common instructions" includes identical instructions, such as in the case where the cores are using the same ISA, as well as equivalent instructions as in the case where one or more cores are running different ISAs. As mentioned before, the processor cores write values from "critical sections" to a queue so that such values can be compared by the queued comparator.

Figure 2:
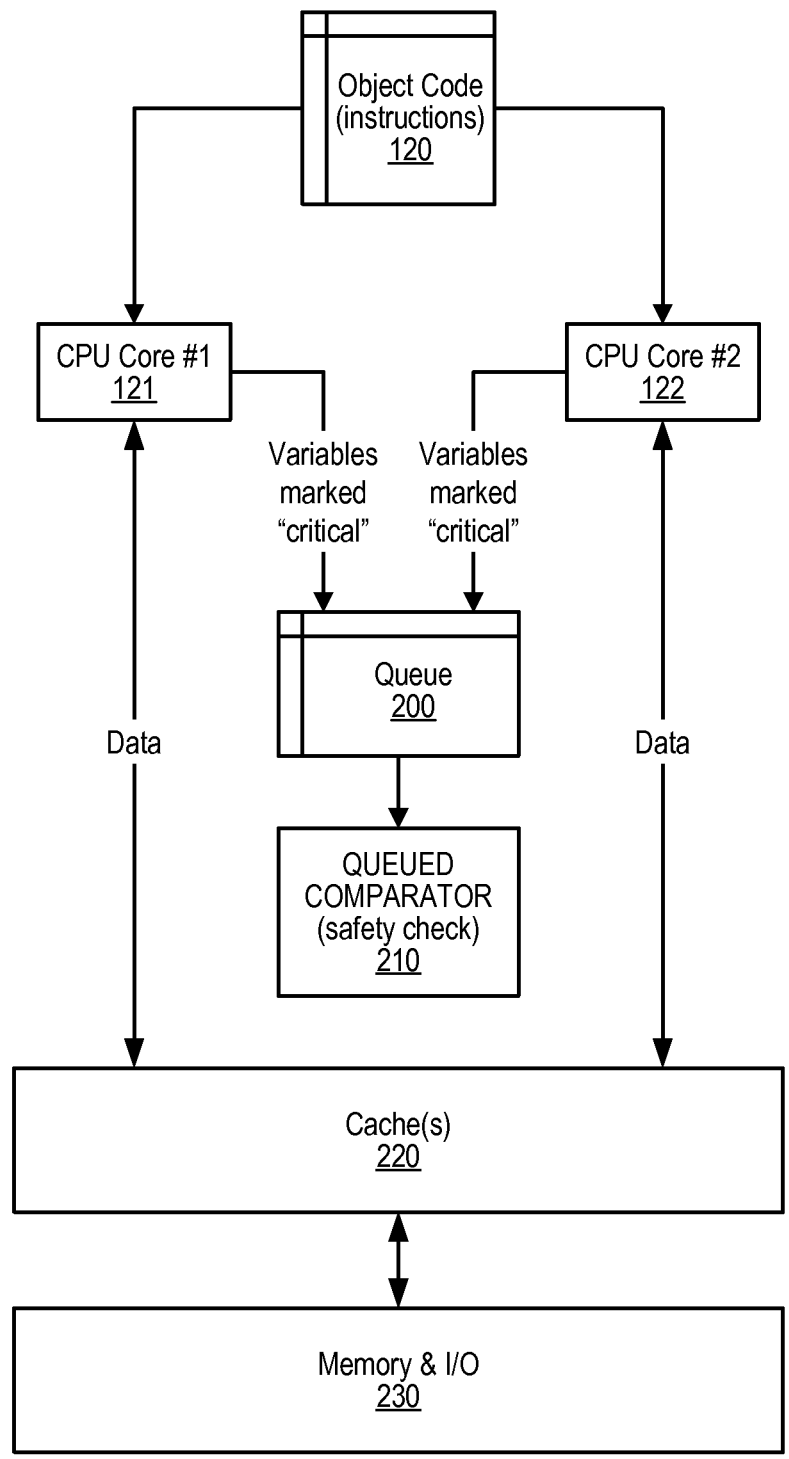
FIG. 2 is a diagram showing object code (instructions) flowing to multiple cores with critical variables compared by a queued comparator.

FIG. 2 is a diagram showing object code (instructions) flowing to multiple cores with critical variables compared by a queued comparator. Object code 110 is the object code that was generated by the enhanced compiler shown in FIG. 1. Two processor cores are shown (CPU Core #1 (121) and CPU Core #2 (122)), however more processor cores can be utilized so long as at least two processor cores are used. Each of the processor cores executes the set of common instructions 110 in parallel with each other. In one embodiment, the processor cores can operate out of phase with each other, or using slightly slower or faster, independent clock sources. As processor cores 121 and 122 are not "in sync" with each other, critical variables are stored in queue 200 rather than immediately compared. Queued comparator 210 checks the values queued by the multiple processor cores (processor cores 121 and 122 in the example shown). In one embodiment, processor cores 121 and 122, queue 200, and queued comparator 210 are included in a common silicon substrate.

The multiple processor cores operating out of phase and utilizing the queued comparator to safety-check critical variables provides a low-impact means whereby system designers can precisely specify what variables are reliable indicators of Safety Compliance and of overall System Health. The resulting architecture, as shown, provides a lower-bandwidth/lower-power, queued, compiler-directed hardware checking system. This lockstep comparison at a higher level of abstraction utilizing queue 200 allows for relaxed static timing constraints, higher clock rates, and more flexible usage of cache or tightly coupled memories. This lockstep comparison at a higher level of abstraction also obviates problems of switching between redundant and separate processing, and enables redundant execution between different instruction-set-architectures (ISAs), compilers, or source code which is often desired in certain environments, such as in aerospace applications, etc.

The source code and compilation mechanism that generates object code 110 utilize a labeling technique to identify critical variables. In one embodiment, the labeling technique uses compiler directives, such as attributes of variables, to easily and unobtrusively specify which variables in a program are reliable indicators of unsafe operation (the "critical values"). Compiler and ISA extensions are used to write the labeled variables ("critical values") into a queued comparator hardware block (queue 200). Queued comparator 210 executes asynchronously with the cores. In one embodiment, the queued comparator executes considerably slower in order to lower overall power consumption (but not so slow as to render the results of the comparison irrelevant). In this manner, only values that are known, by the system designer, to be meaningful indicators of safety and system-health will be compared by queued comparator 210. A fairly-deterministic timeframe exists from when a variable ("critical value") is written to queue 200 to when it is checked by queued comparator 210, without the power overhead of instantaneous comparison utilized by traditional systems. Queued comparator operations are performed simultaneously and in parallel with a first-level D-cache, such as cache 220 (if present). Comparisons performed by queued comparator 210 are therefore consistent with the ISA-level instruction stream being executed, and not filtered by the cache/memory system.

Performing the comparisons asynchronously from the execution stream removes the comparator from the critical path in the system. This allows for a higher frequency of operation and higher system performance as generally found in traditional systems. Safety-critical code, running on two cores for checking, and non-critical code, running unchecked on a single core, can be freely mixed, which can be difficult in a pure-lockstep system, in part because caches go out-of-sync when the cores separately execute different non-critical code. Using the approach found herein, since reads and writes to be compared are queued directly from instruction execution, cache content is irrelevant. Mixing of safety-critical and non-critical code enables cost reductions by allowing non-safety-critical ECUs (Electronic Control Units) to be combined with safety-critical ECUs.

Performing lockstep checking at a higher level of abstraction, as provided by queue 200 and queued comparator 210, removes the restriction that the same core and compiler types need to be used in the "lockstep pair." The higher level of abstraction reduces common-mode faults by allowing the programs being compared to be implemented by independent programming teams, using different compilers, or even cores with different ISAs. The types of comparisons performed by the queued comparator depend upon the implementation diversity. For decoupled lockstep, the queued comparator can check address, process identifier, and read and write data. When using different ISAs, compilers, or source code, wherein the address of the critical value is different, a tag is used to identify the critical variable (value). In this manner, the queued comparator can use the tag to compare values that ought to be equal and issue an exception if such values are not equal.

Processor cores 121 and 122 include a small set of extensions to the core's typical instruction set architecture (ISA) as well as minor language extensions and run-time support. The instructions shown below are examples which could be added to the ISA. These instructions include stdc (Store-with-checking-double), lwc, (load-with-checking-word), etc. The instruction sends the store data (if instruction is a store) to the memory sub-system 230 as well as to the back-side comparison port, along with the effective address, and possibly data necessary to identify the current thread of execution (e.g. a PID value, etc.). Check rN,Q is an instruction to check a specific register value. The specified register's value is sent to the comparison port, along with the register number and possibly data necessary to identify the current thread of execution (e.g. a PID value, etc.). The "Q" instruction field specifies a particular comparison queue. The csync instruction is an instruction to synchronize a processor core (e.g., core 121, 122, etc.) with checking queue (e.g., queue 200) and with the other processor cores, to limit the temporal difference in execution of critical code.

Language extensions are provided to mark critical sections ("critical values"). In one embodiment, the language extension uses gcc's attribute syntax. This attribute syntax is used by other compilers as well due to the widespread usage of gcc. The compiler tracks the usage of the critical variables, converting any register-spilling (stores) into checked stores. Highly critical variables can have extra checking done via the check instruction. The compiler could also use its knowledge of the program flow to automatically add checking of sub-expression values, etc. In one embodiment, an optional priority value can be provided when marking a critical section so that queued values would receive further, more enhanced, checking. Such a priority value assigned to a critical section (critical value) allows the compiler to perform different kinds or amounts of checking, based upon the criticality of the data being checked.

Figure 3:
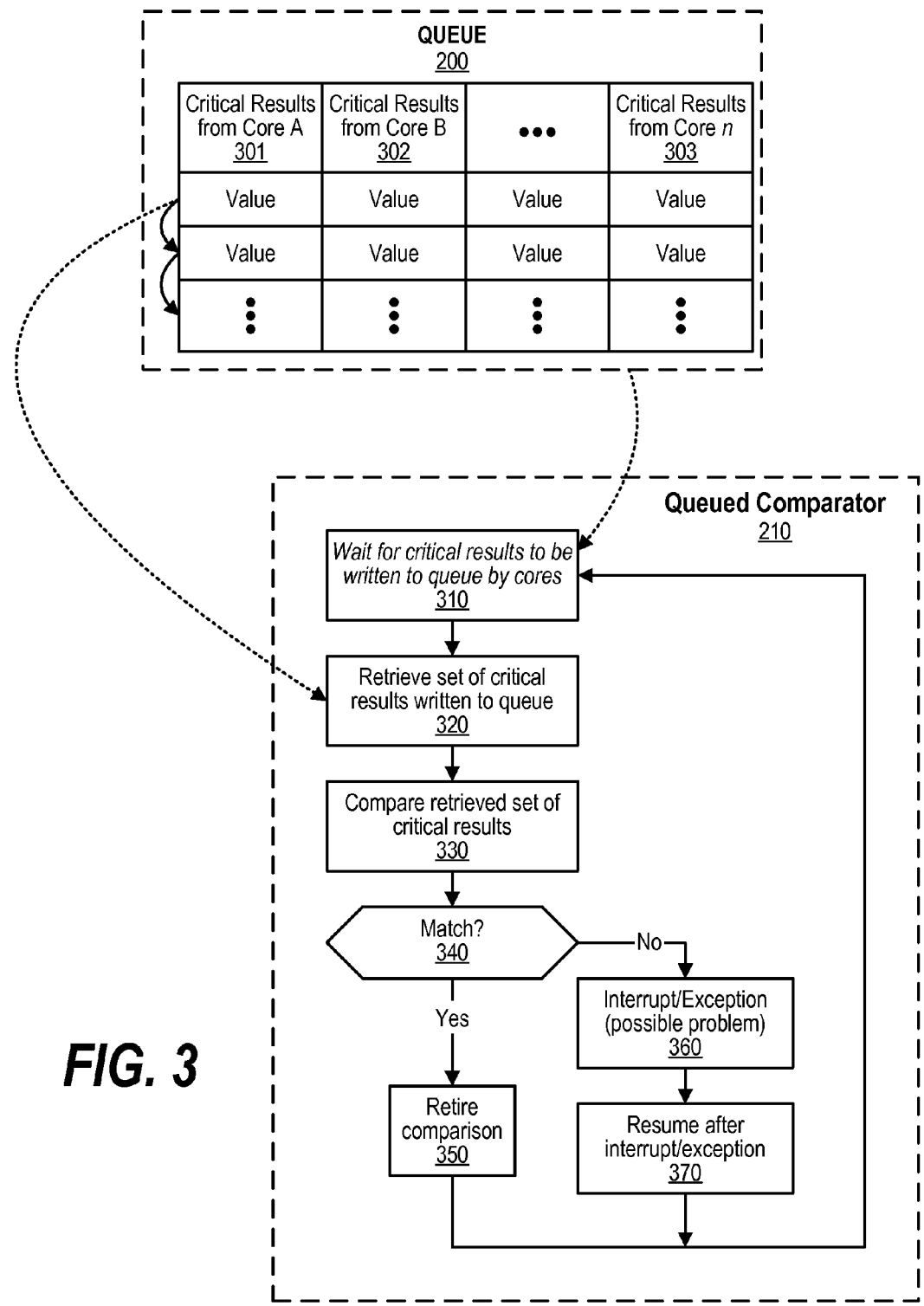
FIG. 3 is a flow diagram depicting steps performed by the queued comparator.

FIG. 3 is a flow diagram depicting steps performed by the queued comparator. Queue 200, as discussed above, is a storage area where critical values are queued by various processor cores so that the critical values can be asynchronously checked by queued comparator 210. While a single queue is shown, those skilled in the art will appreciate that queued comparator can be designed to manage multiple queues (e.g., for different levels of criticality, different amounts of checking, etc.). In FIG. 3, critical values (results) based on the various processor cores executing critical sections of code are shown in queue 200. In addition, FIG. 3 depicts that any number of processor cores can be utilized with each of the processor cores storing results in the queue and the queued comparator checking to ensure all of the values from each of the processor cores are equal. Critical results from Core A (301), Core B (302), and Core n (303) are shown. Operation of queued comparator 210 is shown depicting how the queued comparator manages the queue.

Queued comparator operation commences at step 310 with the queued comparator waiting for a set of critical values to be written to the queue by the various processor cores. When a set of critical values has been written to the queue by the processor cores, the queued comparator retrieves the queued values at step 320. At step 330, the queued comparator checks the retrieved values to ensure that all of the values for the same critical variable are the same (equal). In one embodiment, values are compared by their relative placement in the queue so that all first-to-arrive entries to the queue are compared, all second-to-arrive entries to the queue are compared, and so on. In another embodiment, tags or additional information such as addresses or other identifiers are written to the queue by the processor cores along with the associated values with the queued comparator utilizing this additional metadata to associate values and perform the comparison.

A decision is made by the queued comparator as to whether each of the values written to the queue that corresponds with a common critical variable is equal to the other queued values that also correspond to the common critical variable (decision 340). If all of the values match (are equal), then decision 340 branches to the "yes" branch whereupon, at step 350, the comparison is retired (e.g., the values are removed from the queue, etc.). On the other hand, if any value does not match the other value (or values) written to the queue, then decision 340 branches to the "no" branch whereupon, at step 360, the queued comparator issues an exception (e.g., an interrupt, etc.) so that the error (mismatched critical values) can be analyzed and appropriate action can be taken by the system. At step 370, operation of the queued comparator continues after the issued exception has been handled. Processing then loops back to retrieve (or wait for) the next set of values from queue 200.

Regarding the issued exception at step 360, if an error is detected by the queued comparator, the processor cores can be alerted. This can be handled either as a non-maskable interrupt or via a software-handled exception mechanism. With a non-maskable interrupt, the analysis reveals that a core is experiencing a major problem, so the processor core is restarted. In addition, a thorough self-check is performed, and the restarted core is synchronized with the other core(s). On the other hand, if a transient failure is detected, an exception mechanism can be performed that executes a recovery mechanism and proceeds forward. This approach can be mapped to C++'s exception mechanism: An exception type would be defined and would automatically be thrown by the core's exception handler in the context of the currently running code. In the example below, if the physics calculation is bad, then the recovery method uses the calculation from the last time the calculation was performed:

```
int calc_result(int x,int y) {
    try {
        int z ___attribute___((critical))
            = do_physics_calculation(x,y);
        ...
        return z;
    }
    catch (critical_exception &c) {
        return last_physics_calculation( );
    }
}
```

Figure 4:
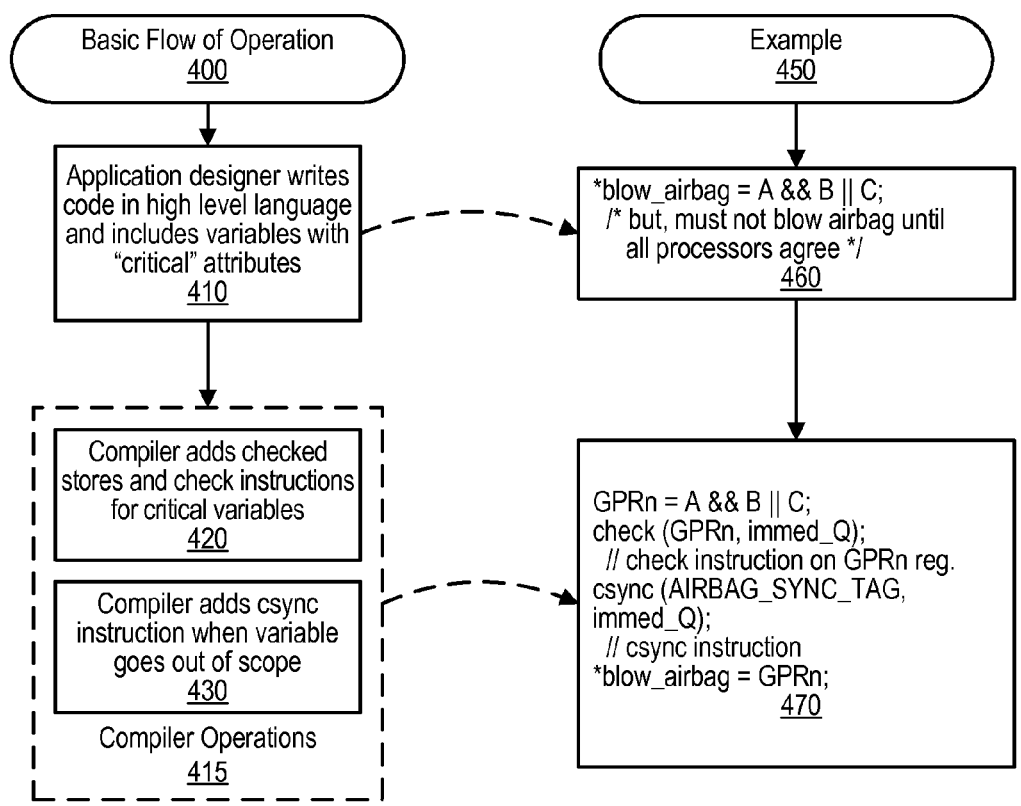
FIG. 4 is a flowchart showing an example situation where a critical variable is identified and additional instructions are inserted to check the critical variable.

FIG. 4 is a flowchart showing an example situation where a critical variable is identified and additional instructions are inserted to check the critical variable. The basic flow of operation is depicted commencing at 400 with corresponding examples shown commencing at 450. At step 410, the application, or system, designer writes code in a high level programming language (e.g., C++, etc.) and includes variable with "critical" attributes, identified as "critical" with a programming construct understood by the compiler. A snippet of code is shown in example 460 with the example being a code segment that determines when an automatic air bag is deployed (e.g., during a car accident, etc.). Example 460 reads as follows:

```
*blow_airbag = A && B || C; /* but, must not blow airbag
   until all processors agree */
```

Compiler operations related to the critical values written in step 410 are depicted at 415 in steps 420 and 430. At step 420, the compiler identifies the critical variables (values) and adds checked stores and check instructions for such critical variables. At step 430, the compiler adds a synchronize (csync) instruction, preventing further processing until all queued comparisons pass, when the variable goes out of scope. The resulting code, after being processed by the compiler (or pre-compiler) is shown in example 470 with the resulting code reading as follows:

```
GPRn = A && B || C;
check (GPRn, immed_Q); // check instruction on GPRn reg.
csync (AIRBAG_SYNC_TAG, immed_Q); // csync instruction
*blow_airbag = GPRn;
```

The result of the above code will cause the value in each processor core's GPRn register to be queued and checked by the queued comparator.

"immed_Q" above suggests a zero-depth queue that always checks queued values immediately (final-comparison registers only). This is especially appropriate when an action must be agreed upon immediately, whereas a deeper "check as time permits" queue is especially appropriate for on-going verification of the safety of the system as a whole.

Figure 5:
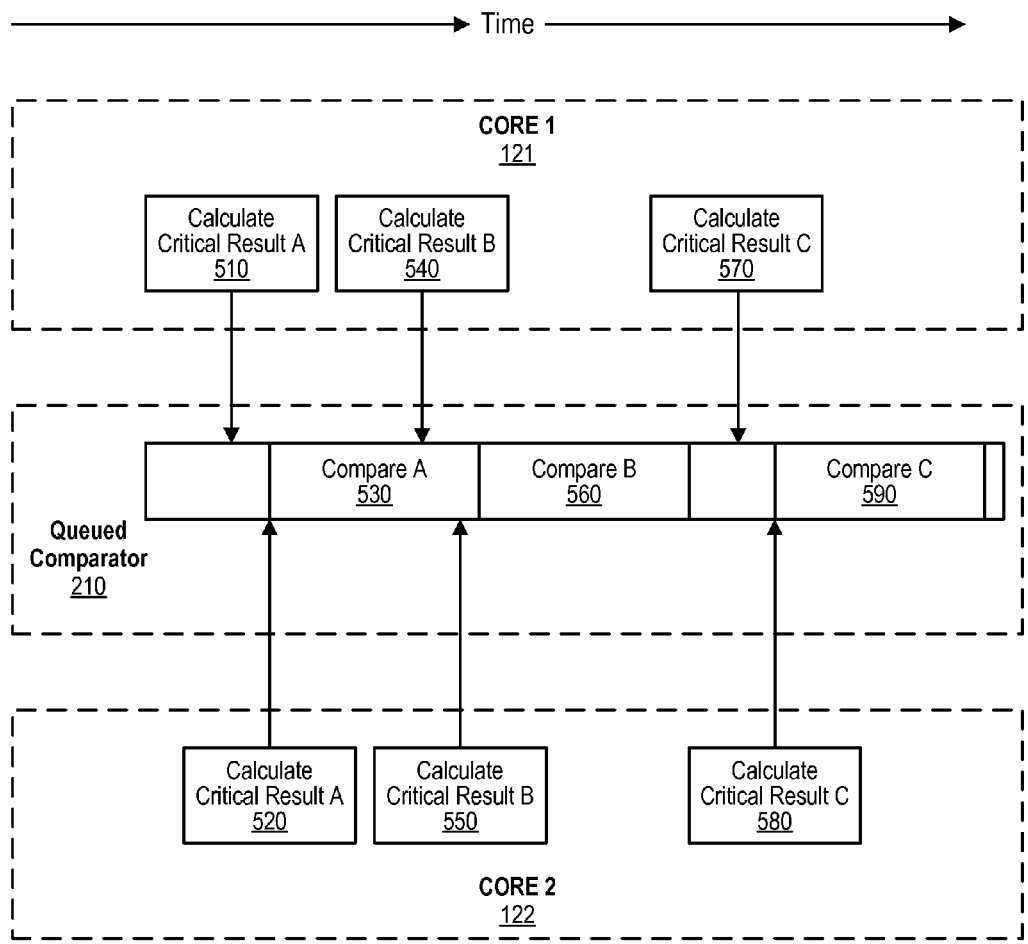
FIG. 5 is a time diagram showing critical variables being provided to the queued comparator by multiple processors that can operate out of phase with each other.

FIG. 5 is a time diagram showing critical variables being provided to the queued comparator by multiple processors that can operate out of phase with each other. While the code is executing, the developer may want to ensure that a maximum amount of time between adjacent comparisons or synchronizations is maintained. Sparse comparisons may not detect faults within process safety time, and sparse synchronizations may cause core execution streams to be too far apart. In one embodiment, a "watchdog" process monitors the amount of time between subsequent queue entries or synchronizations. In this embodiment, the watchdog process generates an interrupt or debug event to the system if a programmable threshold is exceeded. In this manner, the cores can operate out-of-phase with one another while maintaining a workable spacing between the cores.

In the example shown, Core 1 (121) is running slightly ahead of Core 2 (122) with the calculations queued by Core 1 arriving at the queue slightly before those of Core 2. In the example shown, three critical results (values) are being queued for comparison by queued comparator 210 with time progressing from left to right. At 510 Core 1 calculates critical Result A and queues the result for comparison. Queued comparator 210 cannot commence comparing Result A until the corresponding critical result is queued by Core 2 which occurs at 520. The queued comparator takes some amount of time to compare the values for Result A which is depicted by time block 530. In the example, while queued comparator is processing Result A, the processor cores calculate values corresponding to critical Result B which arrive at the queue at 540 for Core 1 and 550 for Core 2. As the queued comparator is currently comparing the values for Result A, the comparison for Result B does not commence until after the comparison of values of Result A have completed. Time block 560 depicts the time taken by the queued comparator to compare the values corresponding to Result B. In the example, the values for Result C do not arrive at the queue until after the queued comparator has completed the comparison of the values for Result B. Core 1 queues the value of Result C at 570 and Core 2 queues the value of Result C at 580. Once again, the value from Core 1 arrives at the queue before the value from Core 2, so the queued comparator waits until all values for Result C have arrived at the queue before processing (comparing) the values, which is depicted by time block 590.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, and conventional procedural programming languages, such as the "C" programming language, assembly language or similar programming languages. The program code may execute entirely on the, standalone network appliance, computer Server, as add-on card to Servers, across multiple computer systems, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processors, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   executing a set of common instructions, wherein each of the common instructions is executed by at least two processor cores, and wherein the set of common instructions comprises critical section and a non-critical section;
   queuing, by each of the processor cores, a value resulting from at least one of the common instructions executed by the processor core, wherein executing the critical section generates the value;
   comparing the queued values; and
   issuing an exception in response to the comparison revealing a different value queued by at least one of the processor cores.

2. The computer-implemented method of claim 1 further comprising:
   prior to the executing:
      identifying a critical section of a source code; and
      compiling the source code, including the identified critical section, of the source code, into the set of common instructions, wherein compiling the identified critical section of the source code results in the critical section of the common instructions.

3. The computer-implemented method of claim 2 wherein the compiling further comprises:
   inserting a plurality of checking codes corresponding to the identified critical section, of the source code, wherein the checking code includes instructions to queue the value.

4. The computer-implemented method of claim 1 wherein the comparing is performed by a queued comparator and wherein operation of the queued comparator comprises:
   retrieving the queued values stored by the plurality of processor cores;
   comparing the retrieved queued values;
   retiring the retrieved values in response to each of the values being equal; and
   wherein the issuing of the exception is performed in response to any of the values being unequal.

5. The computer-implemented method of claim 4 wherein the values are queued to a common queue managed by the queued comparator.

6. The computer-implemented method of claim 1 wherein each of the processor cores are time-decoupled and wherein at least one of the processor cores operates out of phase with the other processor cores.

7. The computer-implemented method of claim 1 further comprising:
   queuing a plurality of queued values, including the value, by the processor cores, wherein the queuing is performed when a plurality of critical sections of the common instructions are executed;
   comparing each set of values queued by the processor cores; and
   issuing the exception in response to each set of values that are unequal to each other.

8. A system comprising:
   one or more processor cores, wherein each of the processor cores executes a set of common instructions, and wherein the set of common instructions comprises a critical section and a non-critical section;
   a queue accessible by the processors, wherein a value is stored in the queue by each of the processor cores after executing the common instructions, wherein executing the critical section generates the value; and
   a queue comparator that compares values stored in the queue and issues an exception in response to unequal values being stored in the queue after executing the common instructions.

9. The system of claim 8 further comprising:
   a source code that includes an identified critical section; and
   a compiler that compiles the source code, including the identified critical section of the source code, into the set of common instructions, wherein compiling the identified critical section of the source code results in the critical section of the common instructions.

10. The system of claim 9 further comprising:
    checking code inserted by the compiler into the set of common instructions, wherein the checking code includes instructions to store the value in the queue.

11. The system of claim 8 wherein the queued comparator performs a set of actions comprising:
    retrieving, from the queue, the queued values stored in the queue by the processor cores;
    comparing the retrieved queued values;
    retiring the retrieved values in response to each of the values being equal; and
    issuing the exception in response to any of the values being unequal.

12. The system of claim 8 wherein each of the processor cores are time-decoupled and wherein at least one of the processor cores operates out of phase with the other processor cores.

13. The system of claim 8 further comprising:
storing a plurality of values, including the value, by the processor cores, into the queue, wherein the storing is performed when a plurality of critical sections of the common instructions are executed;
comparing, by the queued comparator, each set of values stored by the processor cores; and
issuing the exception in response to each set of values that are unequal to each other.

14. The system of claim 8 wherein the plurality of processor cores, the queue, and the queued comparator are included in a common silicon substrate.

15. A computer-implemented method comprising:
retrieving a source code, wherein the source code includes a critical section;
compiling the retrieved source code into a set of instructions;
executing each of the instructions by two or more processor cores;
writing, by each of the processor cores, a value generated by the executing of the critical section, wherein the values are written to a queue; and
issuing an exception in response to the values being unequal.

16. The computer-implemented method of claim 15 wherein the compiling further comprises:
inserting a plurality of checking code corresponding to the critical section, wherein the checking code includes instructions to write the value to the queue.

17. The computer-implemented method of claim 15 wherein the comparing is performed by a queued comparator and wherein operation of the queued comparator comprises:
retrieving the values from the queue;
comparing the retrieved queued values;
retiring the retrieved values in response to each of the values being equal; and
issuing the exception in response to the values being unequal.

18. The computer-implemented method of claim 17 wherein each of the processor cores are time-decoupled and wherein at least one of the processor cores operates out of phase with the other processor cores.

19. The computer-implemented method of claim 18 wherein the two or more processor cores, the queue, and the queued comparator are included in a common silicon substrate.

20. The computer-implemented method of claim 19 wherein the critical section corresponds to a safety check and wherein the value corresponds to a control of a safety system.

* * * * *